United States Patent [19]

Wen-Yin

[11] Patent Number: 5,099,664
[45] Date of Patent: Mar. 31, 1992

[54] AUTOMOBILE STEERING LOCK

[76] Inventor: Wu Wen-Yin, 8th Floor, Room 2, No. 22 Chung Chen 2rd Rd., Kaohsiung City, Taiwan

[21] Appl. No.: 717,059

[22] Filed: Jun. 18, 1991

[51] Int. Cl.⁵ .............................................. B60R 25/02
[52] U.S. Cl. ........................................ 70/209; 70/226
[58] Field of Search ................... 70/16, 207, 209, 211, 70/212, 225, 226, 237, 238, 380

[56] References Cited

U.S. PATENT DOCUMENTS

| | | | |
|---|---|---|---|
| 3,245,239 | 4/1966 | Zaidener | 70/211 |
| 4,304,110 | 12/1981 | Fain | 70/209 |
| 4,887,443 | 12/1989 | Wang | 70/226 X |
| 4,935,047 | 6/1990 | Wu | 70/209 |

FOREIGN PATENT DOCUMENTS

| | | | |
|---|---|---|---|
| 919278 | 10/1954 | Fed. Rep. of Germany | 70/238 |
| 6808902 | 12/1969 | Netherlands | 70/16 |
| 587694 | 5/1947 | United Kingdom | 70/16 |
| 2024307 | 1/1980 | United Kingdom | 70/238 |

Primary Examiner—Lloyd A. Gall
Attorney, Agent, or Firm—Bacon & Thomas

[57] ABSTRACT

An automobile steering lock comprising an elongated tubular member having a central passage extending along an axis there-through, an elongated rod member telescopically movable in the central passage of the tubular member, a hook on the tubular member and a hook or the rod member for engaging opposed portions of a steering wheel, a lock housing for containing a key lock having a bearing to prop up a latch bolt having at least two humps for engaging any two adjacent annular grooves on the rod member to immovably lock the rod member in relation to the tubular member.

2 Claims, 3 Drawing Sheets

AUTOMOBILE STEERING LOCK

BACKGROUND OF THE INVENTION

Automobile steering locks are widely used for preventing automobiles from being stolen. Such a lock may engage a steering wheel and extend therefrom. There are many kinds of steering locks, such as disclosed by U.S. Pat. Nos. 4,103,544, 3,462,982, 4,738,127, and 4,747,279. Though they generally function, well with key locks attached thereto, the movement stopping structure of a key lock against a rod member has not been improved. Most key locks have a bearing of semi-circular shape for stopping the rod member, and this bearing can be broken by a vertical edge pry tool inserted between two annular grooves of the rod member. When a stroke is repeatedly applied on the steering lock with great force the bearing is broken and can be moved out of the steering lock along the hollow space between the annular grooves. Thus, numerous cars are still stolen by destroying steering locks as well as by illegal opening of locks.

Those steering locks of U.S. Pat. Nos. 4,103,544, 3,462,982, 4,738,127, and 4,747,279 have only one outer end extending out of a steering wheel for preventing it from rotating thus, still leaving some opportunity for rotation.

SUMMARY OF THE INVENTION

This invention provides an automobile steering lock having a more reliable movement stopping structure utilizing a key lock against a rod member than conventional lock. Moreover, the invention has both outer ends extending out of a steering wheel instead of only one end extending out of a steering wheel, as in a conventional lock.

DETAILED DESCRIPTION OF THE INVENTION

Figure 1:
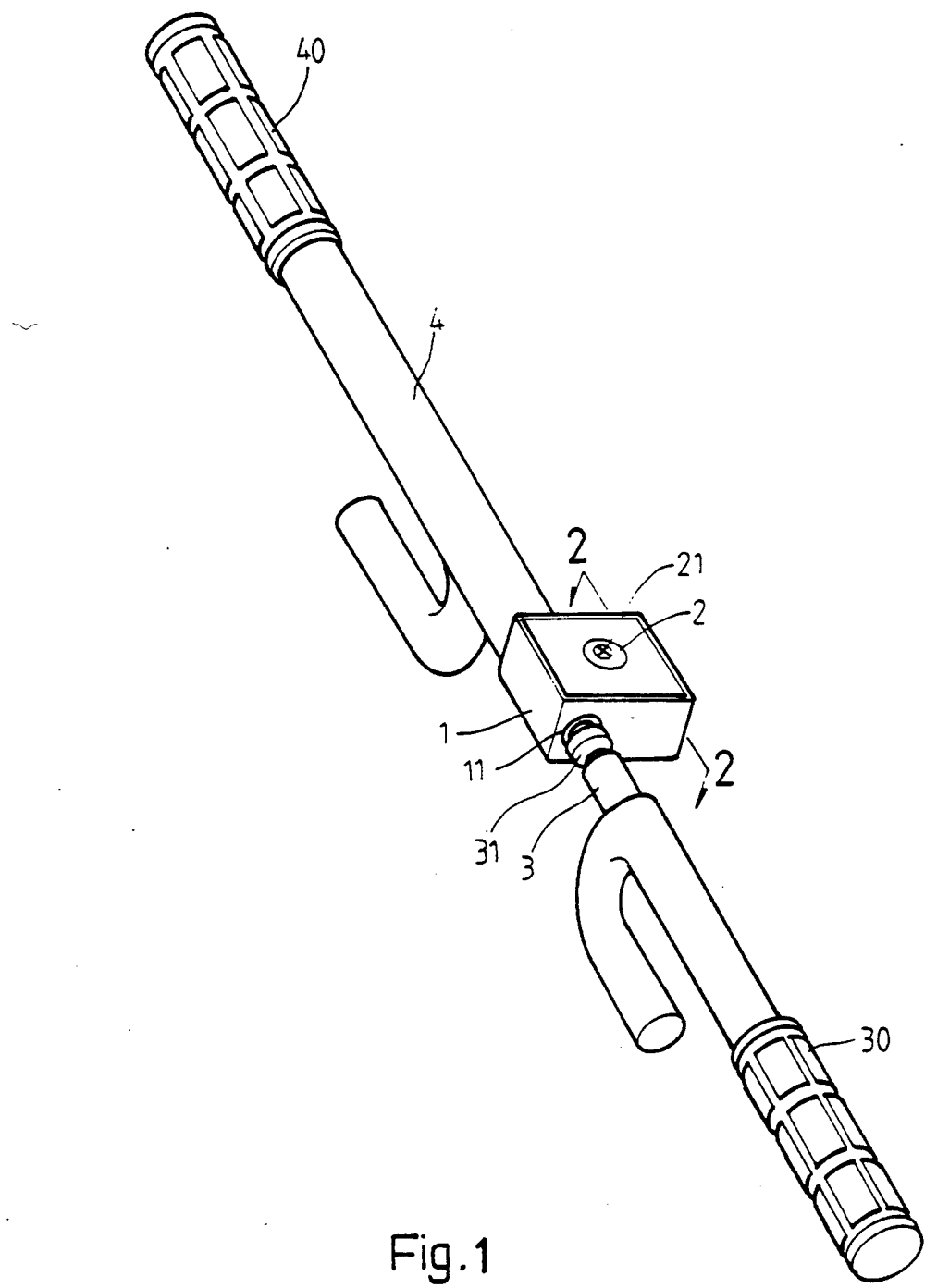
FIG. 1 is a perspective view of the automobile steering lock in the present invention.
Figure 2:
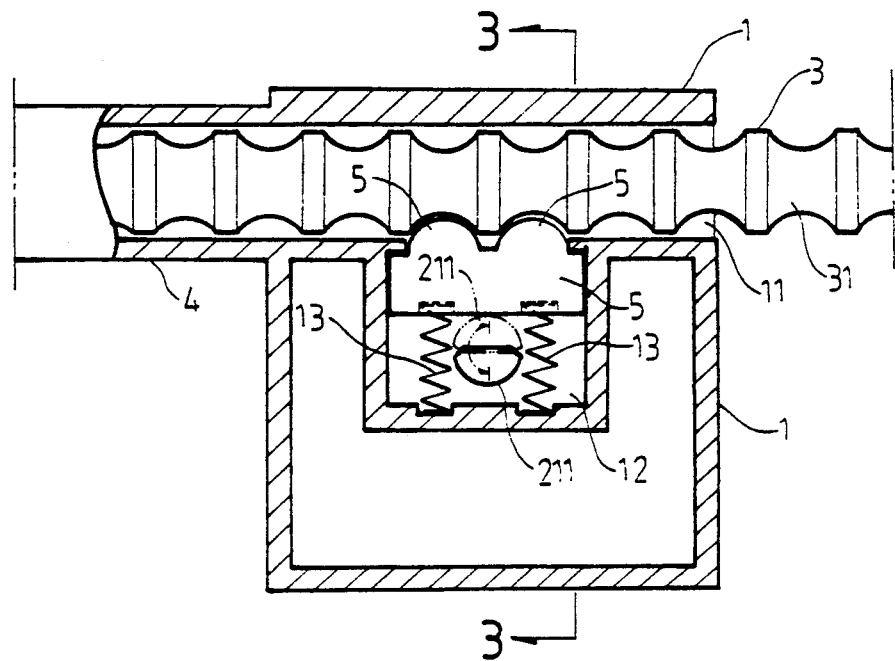
FIG. 2 is the cross-sectional view of 2—2 line on FIG. 1.
Figure 3:
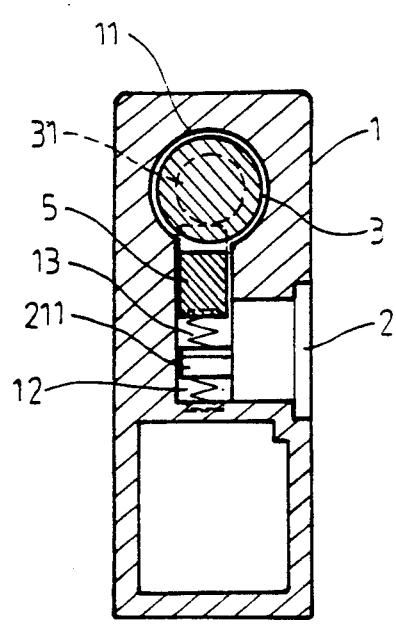
FIG. 3 is the cross-sectional view of 3—3 line on FIG. 2.

An automobile steering lock according to the present invention, as shown in FIGS. 1, 2, and 3, comprises an elongated tubular member 4, an elongated rod member 3 which is dimensioned to move in telescopic fashion within the tubular member 4, two hooks for engaging opposite portions of a steering wheel from the inside thereof, a lock housing 1 joined to one end of the tubular member 4, and a locking mechanism including a locking means 2, locating members in the form of a latch bolt 5, and springs 13, being provided in the lock housing 1.

The tubular member 4 has a central passage 11 running through the member 4. A hook is securely fixed to the member 4 by means of welding near the lock housing 1 and a grip 40 is fixed on the end portion thereof.

The rod member 3 has an elongated rod portion of circular cross-section with the outer diameter being dimensioned slightly less than the diameter of the central passage in the tubular member 4 to enable the rod portion to telescope freely within the tubular member 4. Another hook is securely fixed on the rod member 3 such that it opens opposite to the hook on the tubular member 4 for engagement with a diametrically opposite portion of a steering wheel. A plurality of circumferential annular grooves 31 are axially spaced along a major portion of the rod member 3.

The lock housing 1 is formed in attachment with one end of the tubular member 4, and having a passage of the same diameter as the central passage 11 of the tubular member 4 and communicating with said passage 11 in a coaxial manner so that the rod member 3 can extend telescopically within those passages. The housing 1 contains the lock means 2 with a key lock 21 and a bearing 211 extending in a cavity 12 provided between the passage and the key lock 21 and communicating with the passage, and also the springs 13 and latch bolt 5. The two springs 13 are positioned in the cavity 12 with their bottom ends resting on the bottom cavity wall and the top ends engaging the bottom surface of the latch bolt 5, the latter having at least two humps on the upper surface with the same curvature as that of an annular groove 31 of the rod member 3. The two humps always partially extend in the passage in the housing 1, pushed up by the springs 13 so that the latch bolt 5 can fit in any two adjacent annular grooves 31 of the rod member 3. This accordingly locks the steering lock on a steering wheel, when the latch bolt 5 is rendered immovable after the bearing 211 is rotated 180 degrees by a correct key inserted in the key hole in the key lock 21.

The latch bolt 5 is constantly pushed up by the springs 13 to its highest point. When the bottom of bolt 5 is not propped up by the bearing 211, bolt 5 can be vertically moved up and down freely through the elasticity of the springs 13, thus enabling the rod member 3 to be freely moved to adjust its location in the tubular member 4. When the key lock 21 is locked by a correct key, turning the semi-circular bearing 211 for 180 degrees to prop up the bottom of the latch bolt 5, which then cannot move down, thus maintaining its humps immovably secured within two adjacent annular grooves 31. Therefore, this steering lock can be locked firmly on a steering wheel and prevent a car from being stolen.

Figure 4:
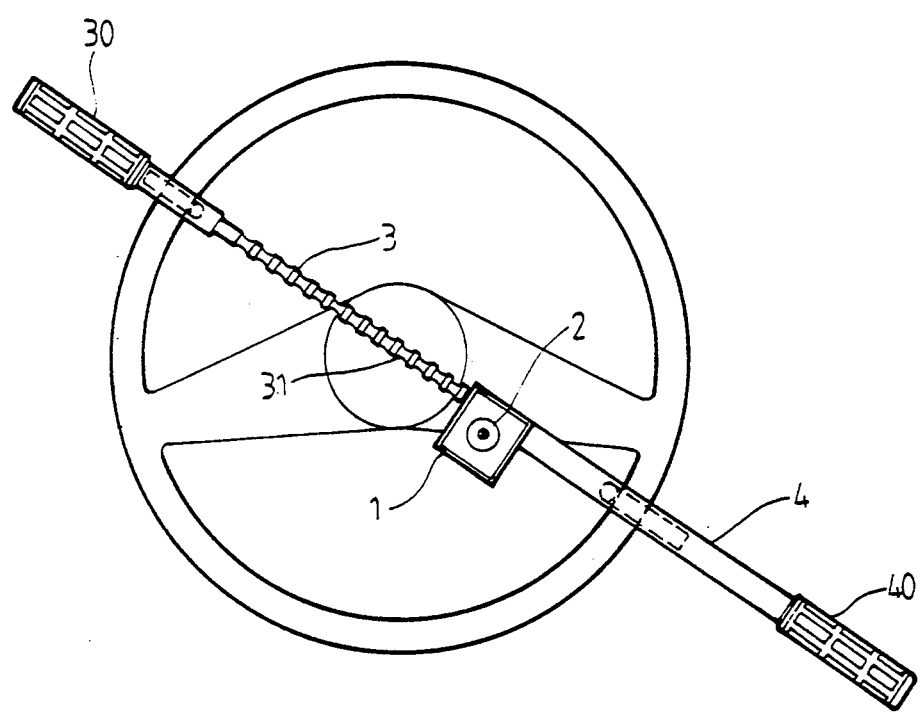
FIG. 4 is a perspective view of the automobile steering lock of the present invention shown installed on a car steering wheel.

As shown in FIGS. 1, 4, the rod member 3 and the tubular member 4 are respectively provided with grips 30, 40 at their out free ends and having such a length that both members 3, 4, can extend out of a steering wheel for a sufficient length to prevent the steering wheel from turning around after this steering lock has been locked thereon.

This steering lock is considered to have the following functions and advantages.

1. The engagement combination of two or more humps in the latch bolt with any two or more adjacent annular grooves can prevent an external force from breaking this lock.

2. The humps formed as an integral unit with the latch bolt affords safety from breaking by a horizontal striking force.

3. An external force can never be transmitted to the bearing of the key lock since it is hidden and protected by surrounding material and such external force is mostly sustained by the latch bolt as well.

4. Its structure is very practical in use and safe against theft.

5. Both grips on two ends of this lock can reduce the possible angle for a steering wheel to be rotated, upgrading the safety against theft.

What is claimed is:

1. An automobile steering lock for attachment to the steering wheel of an automobile comprising:
   a) an elongate tubular member having an inner end and an outer end, a grip provided on the outer end, a central passage extending along its longitudinal axis therethrough, and a hook secured adjacent the inner end for engaging a first inside portion of a steering wheel;
   b) an elongate rod member including an elongate rod portion telescopically receivable within the central passage of the tubular member, a plurality of annular grooves spaced along the length of the rod portion, an inner end and an outer end, a hook secured adjacent the annular grooves for engaging a second inside portion of the steering wheel diametrically opposite to the first inside portion, and a grip provided on the outer end;
   c) the tubular and rod members being of sufficient length so that when the lock is attached to the steering wheel, the grips on the members are extended for substantial distances beyond the periphery of the wheel;
   d) a lock housing secured to the inner end of the tubular member, the lock housing including a locking mechanism and a passage extending therethrough, the passage of the lock housing and the central passage of the tubular member being coaxial for telescopically receiving the rod portion of the rod member therein, and a rectangular cavity extending below the lock housing passage;
   e) a locking mechanism disposed within the lock housing and including a latch bolt within the rectangular cavity, a pair of springs urging the latch bolt towards the central passage of the tubular member, a key lock with a semicircular bearing positioned below the latch bolt; and
   f) the latch bolt including at least two humps on an upper surface for selectively engaging any two adjacent annular grooves of the rod portion, whereby when the semicircular bearing is disposed in an unlocked position, a flat surface of the bearing faces a bottom of the latch bolt and thereby permit its movement against the spring bias and away from the central passage, and when the key lock is disposed in a locking position, the bearing is rotated 180° and a semicircular face thereon is disposed into engagement with the bottom of the latch bolt to immovably maintain the two humps within the two adjacent annular grooves of the rod portion, thereby preventing telescopic movement of the rod member relative to the tubular member.

2. The steering lock of claim 1 wherein the two humps are integrally formed with the latch bolt.

* * * * *